(12) United States Patent
Vojnovich (10) Patent No.: US 9,870,158 B2
(45) Date of Patent: Jan. 16, 2018

(54) RACK MOUNTABLE COMPUTER SYSTEM THAT INCLUDES MICROARRAY STORAGE SYSTEMS

(71) Applicant: LENOVO ENTERPRISE SOLUTIONS (SINGAPORE) PTE. LTD., Singapore (SG)

(72) Inventor: Theodore B. Vojnovich, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 31 days.

(21) Appl. No.: 14/936,780

(22) Filed: Nov. 10, 2015

(65) Prior Publication Data

US 2017/0131921 A1 May 11, 2017

(51) Int. Cl.
*G06F 3/06* (2006.01)

(52) U.S. Cl.
CPC .......... *G06F 3/0613* (2013.01); *G06F 3/0635* (2013.01); *G06F 3/0659* (2013.01); *G06F 3/0665* (2013.01); *G06F 3/0685* (2013.01); *G06F 3/0689* (2013.01)

(58) Field of Classification Search
CPC .... G06F 3/0613; G06F 3/0635; G06F 3/0659; G06F 3/0665; G06F 3/0689
See application file for complete search history.

(56) References Cited

U.S. PATENT DOCUMENTS

| | | | | |
|---|---|---|---|---|
| 6,188,571 B1* | 2/2001 | Roganti | ................. | G06F 1/184 361/679.33 |
| 6,671,776 B1* | 12/2003 | DeKoning | ............ | G06F 3/0607 710/38 |
| 8,089,903 B2* | 1/2012 | Leef | ........................ | H04L 12/24 370/254 |
| 2006/0242380 A1* | 10/2006 | Korgaonkar | .......... | G06F 3/0608 711/170 |
| 2012/0185643 A1* | 7/2012 | DeKoning | ............ | G06F 3/0607 711/114 |
| 2012/0331255 A1* | 12/2012 | Fuks | .................... | G06F 13/1657 711/163 |
| 2013/0024614 A1* | 1/2013 | Natrajan | ............. | H04L 67/1097 711/114 |
| 2013/0117603 A1* | 5/2013 | Jess | ..................... | G06F 11/1443 714/6.22 |

(Continued)

*Primary Examiner* — Ryan Bertram
(74) *Attorney, Agent, or Firm* — Brandon C. Kennedy; Jason A. Friday; Kennedy Lenart Spraggins LLP (57) ABSTRACT

Data communications within a rack mountable microarray system includes: sending, from a microarray controller to a communication fabric, a request for data, where the microarray controller is one of the plurality of microarray controllers housed within a drive bay of an enclosure, where the enclosure includes a plurality of storage devices, and where the microarray controller controls one or more of the storage devices; determining, by the communication fabric, a destination microarray controller from among the plurality of microarray controllers, where the destination microarray controller controls another one or more of the storage devices; sending, from the destination microarray controller to the communication fabric, the data specified by the request for data; and receiving, at the microarray controller from the communication fabric, the data specified by the request for data.

18 Claims, 5 Drawing Sheets

(56) References Cited

U.S. PATENT DOCUMENTS

| | | | |
|---|---|---|---|
| 2013/0294226 A1* | 11/2013 | Lim | H04L 69/40 370/225 |
| 2015/0009616 A1* | 1/2015 | Adrian | H05K 7/1494 361/679.32 |
| 2016/0132699 A1* | 5/2016 | Miller | G06F 21/80 713/193 |
| 2016/0179432 A1* | 6/2016 | Niwa | G06F 3/0638 711/203 |

* cited by examiner

RACK MOUNTABLE COMPUTER SYSTEM THAT INCLUDES MICROARRAY STORAGE SYSTEMS

BACKGROUND OF THE INVENTION

Field of the Invention

The field of the invention is data processing, or, more specifically, rack mountable computer systems that include microarray storage systems and methods and products for data communications within such rack mountable computer systems.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of advancements in computer systems is in management of data storage on a massive scale. For example, data centers now exist for maintaining large amounts of data storage, and these data centers often include racks that include multiple, individual, rack mountable housing units.

SUMMARY

Rack mountable computer systems that include microarray storage systems, methods for data communications within such a rack mountable computer system and products for data communications within such a rack mountable computer system are disclosed in this specification. Data communications within such a rack mountable computer system may include: sending, from a microarray controller to a communication fabric, a request for data, where the microarray controller is one of the plurality of microarray controllers housed within a drive bay of an enclosure, where the enclosure includes a plurality of storage devices, and where the microarray controller controls one or more of the storage devices; determining, by the communication fabric, a destination microarray controller from among the plurality of microarray controllers, where the destination microarray controller controls another one or more of the storage devices; sending, from the destination microarrray controller to the communication fabric, the data specified by the request for data; and receiving, at the microarray controller from the communication fabric, the data specified by the request for data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary rack mountable computer systems that include a microarray system, methods for data communications within such a rack mountable computer system and products for data communications within such a rack mountable computer system are disclosed in this specification are described with reference to the accompanying drawings, beginning with FIG. 1.

Figure 1:
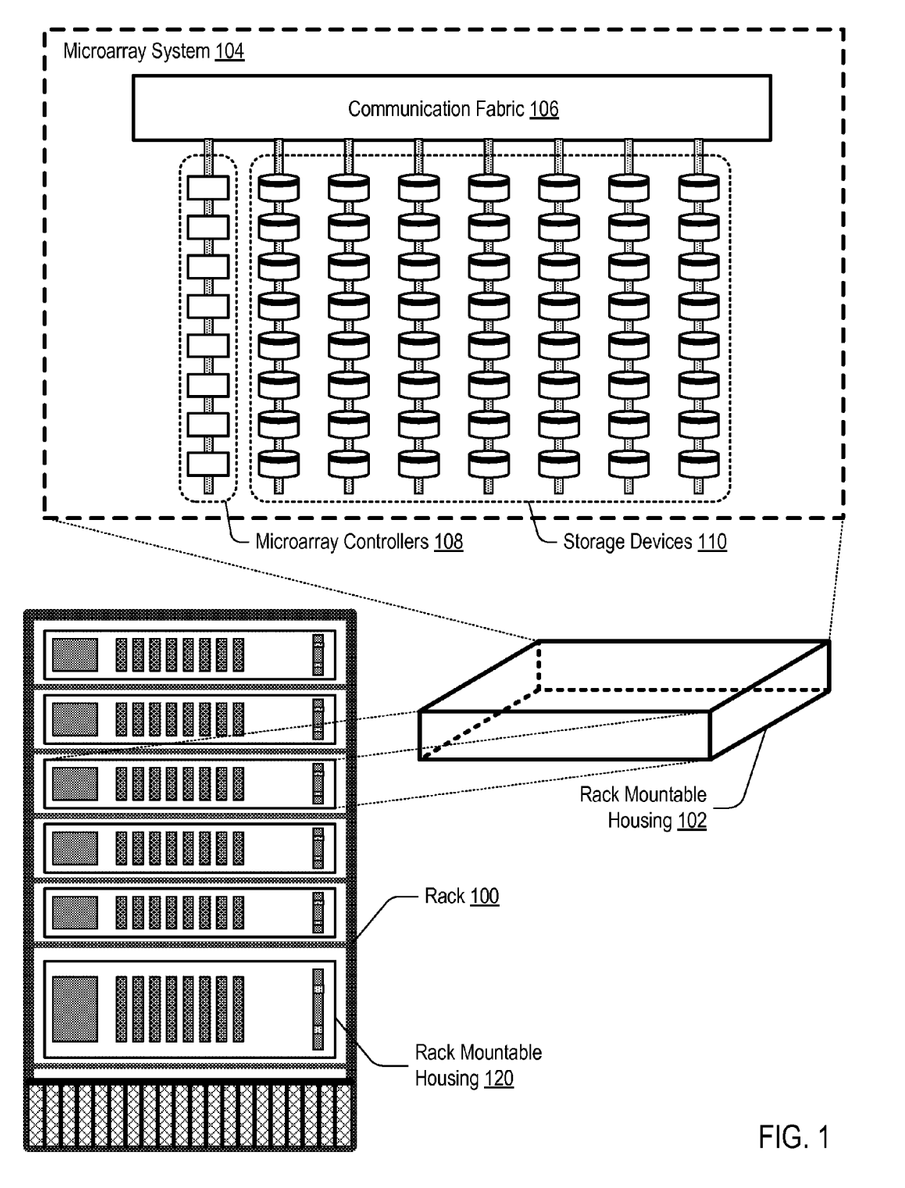
FIG. 1 sets forth a diagram of a microarray system configured according to embodiments of the present invention.

FIG. 1 sets forth a diagram of a microarray system (104) configured according to embodiments of the present invention. The example microarray system includes a number of microarrays. Each microarray may include one or more microarray controllers (108) mapped to one or more storage devices (110). Different example microarrays with different mappings of microarray controllers to storage devices are described in further detail below. As further described below, each microarray may implement a storage system, where different microarrays may implement different types of storage systems.

In some implementations, the different microarrays within a microarray system (104) may communicate with one another to provide data storage services to client applications, such as databases, database services, or in general, any client application requesting services to store and retrieve data. Such communication may be provided over a data communications fabric (106). That is, each microarray controller may be configured to communicate with other microarray controllers and with storage devices (110) over the data communications fabric (106). The example communications fabric (106) of FIG. 1 may implement any number of networking topologies, data communications protocols, switches, and the like. In some embodiments, for example, the communications fabric (106) may implement an Ethernet data communications fabric and may include one or more Ethernet switches.

In some implementations, a rack mountable housing (102) may include any number of drive bays for installing storage devices (110). In some implementations, the microarray controllers (108) may be installed or located within any of the drive bays for which the storage devices (110) may be installed or located. That is, in some implementation each microarray controller (108) may be of the same form factor as that of a storage device (110).

In some implementations, one or more rack mountable housings (102) may fit within a single rack (100), where a rack may be configured to provide power, cooling, and a communications backbone for each of the microarray systems within the rack (100), and for communication with other computer networks or client computer devices. In some cases, the computer networks may include a local computer network within a data center that includes multiple racks (100) of microarray systems (104).

The arrangement of devices making up the exemplary system illustrated in FIG. 1 is for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), iSCSI, SWIFT, and others as will occur to those of skill in the art. Various embodiments of the present invention may be implemented on a variety of hardware platforms in addition to those illustrated in FIG. 1.

A microarray system within a rack mountable housing is generally implemented with computers, that is, with automated computing machinery. In the system of FIG. 1, for example, the microarray system (104), communication fabric (106), microarray controllers (108), and storage devices (110), may all be implemented, to some extent at least, as computers.

Figure 2:
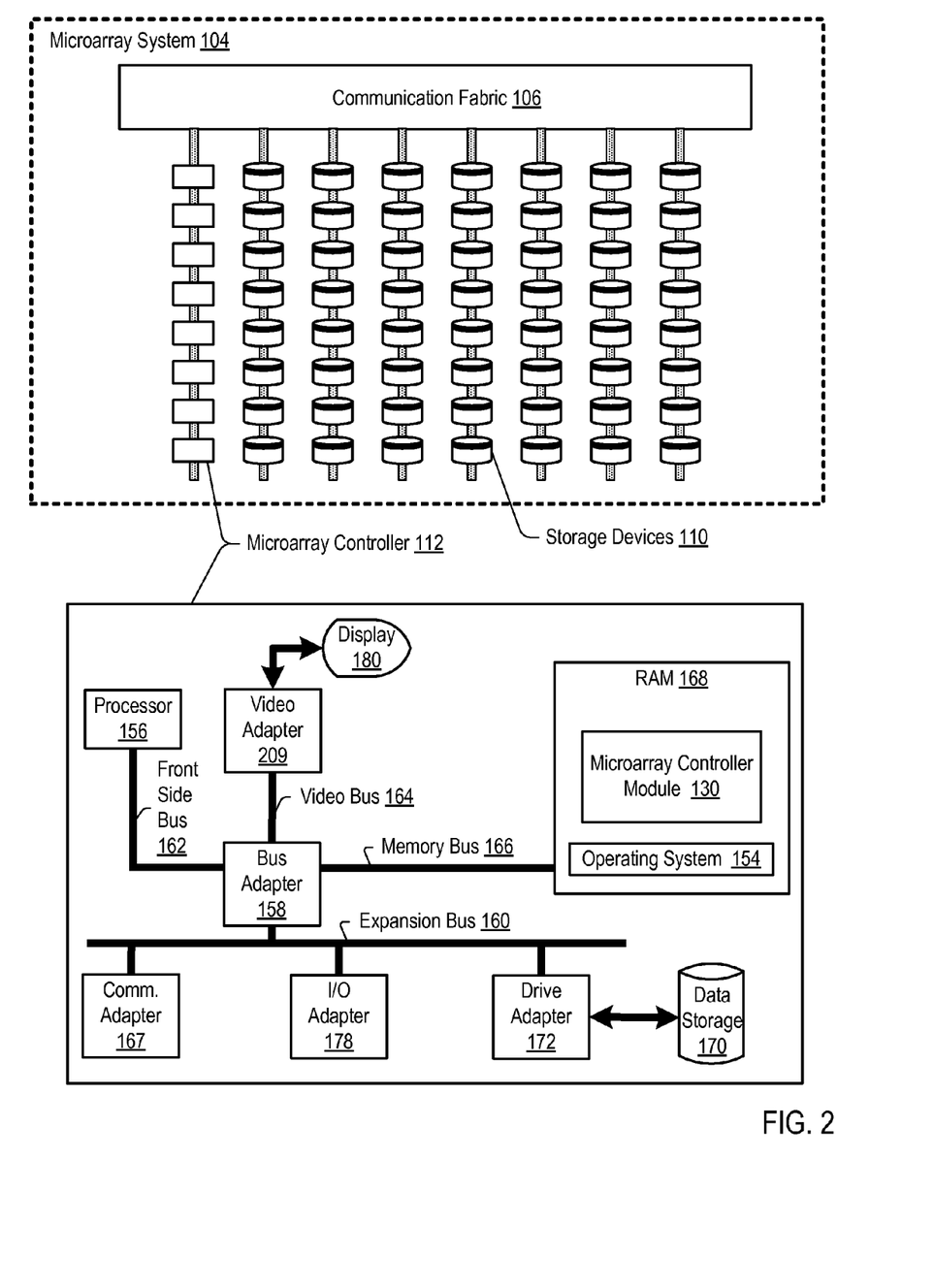
FIG. 2 sets forth a block diagram of automated computing machinery comprising an exemplary microarray controller configured for controlling one or more storage devices of a microarray in the rack mountable microarray system according to embodiments of the present invention.

For further explanation, therefore, FIG. 2 sets forth a block diagram of automated computing machinery comprising an exemplary microarray controller (112) configured for controlling one or more storage devices of a microarray in the rack mountable microarray system according to embodiments of the present invention. The microarray controller (112) of FIG. 2 includes at least one computer processor (156) or 'CPU' as well as random access memory (168) ('RAM') which is connected through a high speed memory bus (166) and bus adapter (158) to processor (156) and to other components of the microarray controller (112). In some implementations, the computer processor (156) may be a low power processor, such as an ARM™ processor, or some other similar low power processor.

Stored in RAM (168) is a microarray control module (130), a module of computer program instructions for controlling one or more storage devices in a microarray of a microarray system within a rack mountable housing, according to embodiments of the present invention.

Also stored in RAM (168) is an operating system (154). Operating systems useful in computers configured for rack mountable computer systems that include microarray systems according to embodiments of the present invention include UNIX™, Linux™, Microsoft XP™, AIX™, IBM's i5/OS™, and others as will occur to those of skill in the art. The operating system (154) and microarray controller module (130) in the example of FIG. 2 are shown in RAM (168), but many components of such software typically are stored in non-volatile memory also, such as, for example, on a disk drive (170).

The microarray controller (112) of FIG. 2 includes a disk drive adapter (172) coupled through an expansion bus (160) and a bus adapter (158) to a processor (156) and other components of the microarray controller (112). The disk drive adapter (172) connects non-volatile data storage to the microarray controller (112) in the form of a disk drive (170). Disk drive adapters useful in computers configured for rack mountable computer systems that include microarray systems according to embodiments of the present invention may include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example microarray controller (112) of FIG. 2 includes one or more input/output ('I/O') adapters (178). I/O adapters implement user-oriented input/output through, for example, software drivers and computer hardware for controlling output to display devices such as computer display screens, as well as user input from user input devices such as keyboards and mice. The example microarray controller (112) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary microarray controller (112) of FIG. 2 includes a communications adapter (167) for data communications with other computers (not shown) and for data communications with data communications networks (not shown). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers according to embodiments of the present invention include modems for wired dial-up communications, Ethernet (IEEE 802.3) adapters for wired data communications, and 802.11 adapters for wireless data communications.

The communications adapter (167) may also adapt the microarray controller (112) for communications with the storage devices and other microarray controllers through the communication fabric (106). In different implementations, communications fabric (106) may be an Ethernet fabric, a Fibre Channel fabric, or more generally, any type of network switch or implementation of a communication protocol configured to provide routing of messages and transfers of data between different computing devices. In some cases, the messages may be in different formats corresponding to different network protocols, or correspond to different storage management systems. Further, the data transfers may be object-based, file-based, block-based, or more generally, any quantity or size of addressable data stored in one or more of the storage devices (110).

In some embodiments, a mapping between microarray controllers and storage devices may be dependent upon an expected workload. For example, if a high expected workload is determined for a given microarray controller of a given microarray, then the given microarray controller may be mapped to a smaller number of storage devices than if a lower workload was expected of the microarray controller. In other words, for different microarrays with different microarray controllers, where the different microarray controllers have similar processing performance—the different microarray controllers may be mapped to different quantities of storage devices based on different expected workloads.

In some embodiments, the architectural configuration of the microarray controllers (108) and the storage devices (110) may be different than depicted in microarray system (104). Generally, a microarray controller of the microarray controllers (108) may be configured to communicate with one or more of the storage devices (110) for which the microarray controller (108) is configured to control.

In some embodiments, different microarray controllers may be configured to have different amounts of processing power, different amounts of storage, or more generally, different combinations of hardware components and different combinations of the processing capabilities of the hardware components. In some cases, the different microarray controllers (108) may be configured with different operating systems. Further, in some cases, a given microarray controller may be configured to control a quantity of storage devices based at least upon one or more performance characteristics of the given microarray controller. For example, a microarray controller may be configured, due to hardware performance characteristics, to control no more than eight (8) storage devices.

In some embodiments, the storage devices (110) may include storage devices of similar or equal storage and performance characteristics. In other embodiments, the storage devices (110) may include different types of storage devices. Storage device may, for example, be configured with different types of memory, different sizes of memory, or different performance characteristics. For example, some of the storage devices may be Flash memory, others may be hard disk drives, and still others may be of some other type of storage.

In different implementations, a microarray system (104) may include multiple microarray controllers (108), multiple storage devices (110), and a communication fabric (106) within a same, single rack mountable housing (102). In some implementations, a rack mountable housing (102) may be referred to as an enclosure, a rack housing unit, a housing unit, or a rack unit. However, the different terminology generally refer to specific physical dimensions of length, height, and width such that the space occupied by the specific physical dimensions of the rack mountable housing fits within a rack (102) along with possibly other rack mountable housings. In different cases, different rack mountable housings may have different physical dimensions of length, height, and width, and still be configured to fit within a single rack (100). For example, different industry standard sizes exist for rack mountable housings, where the different standard sizes may still fit within a same rack. As depicted in FIG. 2, rack (100) may include a rack mountable housing (102) and also include a rack mountable housing (120) with different physical dimensions.

Figure 3:
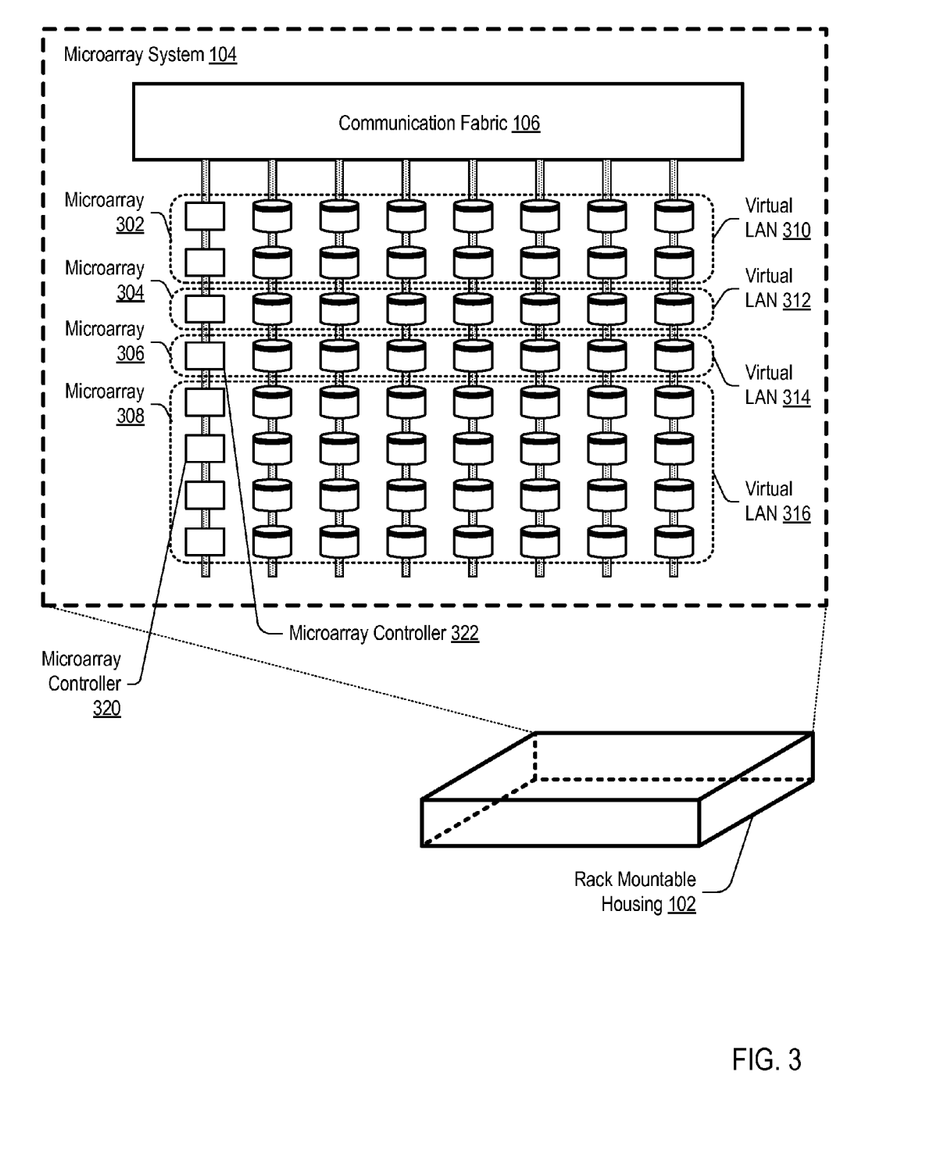
FIG. 3 sets forth an illustration depicting a microarray system within a rack mountable housing according to embodiments of the present invention.

For further explanation, FIG. 3 sets forth an illustration depicting a microarray system (104) within a rack mountable housing (102) according to embodiments of the present invention that includes multiple different microarrays, which in this example are microarray (302), microarray (304), microarray (306), and microarray (308).

In some implementations, different microarrays may be configured to implement different storage management systems. In other implementations, the different microarrays may be configured to implement a same storage management system.

In this example, a microarray (302) may be configured to implement a virtual LAN (310), which in this example includes fourteen (14) storage devices and two (2) microarray controllers; a microarray (304) may be configured to implement a virtual LAN (312), which in this example includes seven (7) storage devices and one (1) microarray controller; a microarray (306) may be configured to implement a virtual LAN (314), which in this example includes seven (7) storage devices and one (1) microarray controller; and a microarray (308) may be configured to implement a virtual LAN (316), which in this example includes twenty-eight (28) storage devices and four (4) microarray controllers.

In this embodiment, the microarray (302) may be configured to implement a block-based storage management system, the microarray (304) may be configured to implement a file-based storage management system, and the microarrays (306) and (308) may be configured to implement an object-based storage management system. In different cases, the files stored and retrieved in the file-based storage management system may be of an arbitrary size, and the blocks stored and retrieved in the block-based storage management system may be defined to be different sizes dependent upon block sizes supported by the particular microarray and the storage devices controlled by a microarray controller or microarray controllers for the particular microarray. Further, in some implementations, a given microarray controller of the microarray system (104) may implement a redundant array of independent disk system, or a RAID system.

Figure 4:
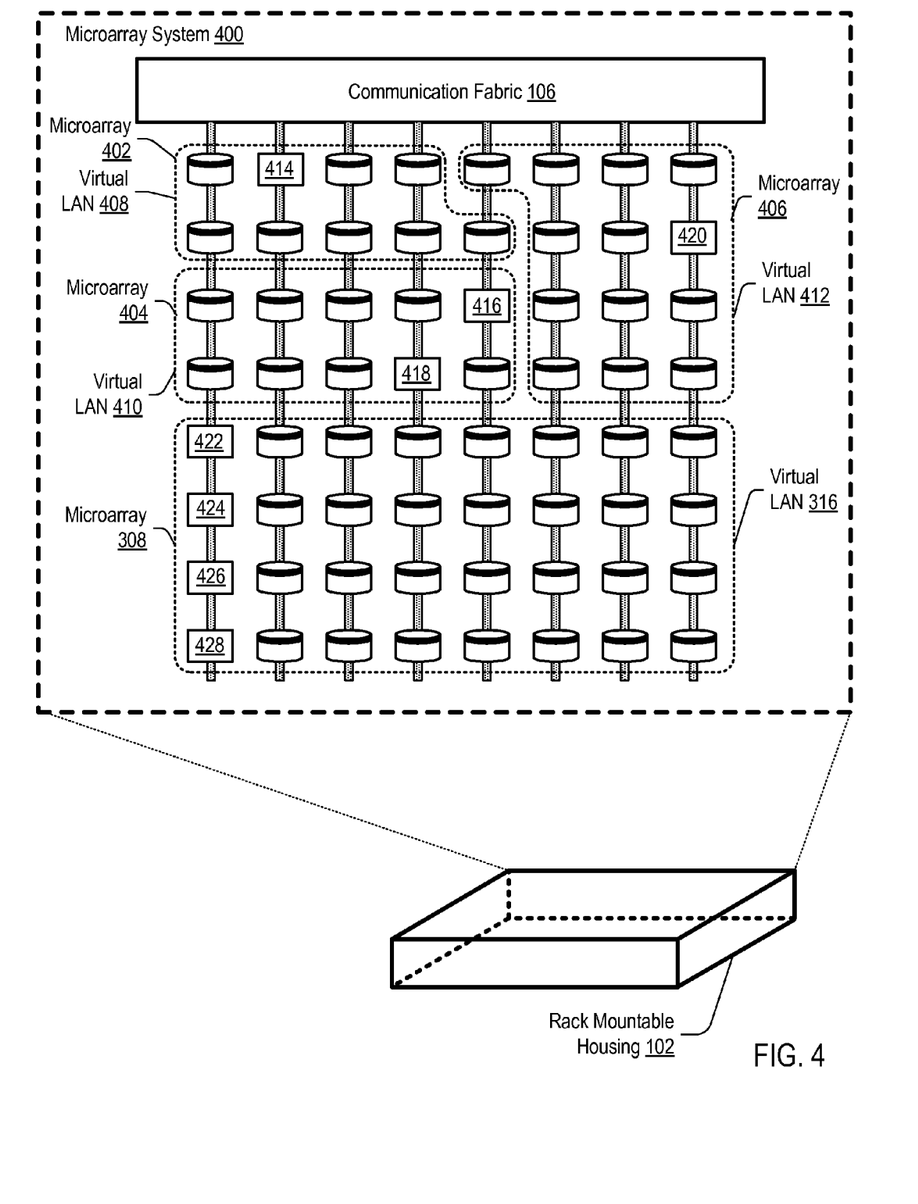
FIG. 4 sets forth an illustration depicting a microarray system within a rack mountable housing according to embodiments of the present invention.

For further explanation, FIG. 4 sets forth an illustration depicting a microarray system (402) within a rack mountable housing according to embodiments of the present invention that includes multiple different microarrays. In this example, the different microarrays are depicted as microarray (308), microarray (402), microarray (404), and microarray (406), where microarray (308) may implement a virtual LAN (316), microarray (402) may implement virtual LAN (408), microarray (404) may implement virtual LAN (410), and microarray (406) may implement virtual LAN (412).

In different embodiments, a given microarray controller may be mapped to any of the storage devices (110) to create a microarray of an arbitrary size, and where the microarray controller or controllers may be arbitrary located within any of the drive bays of the rack mountable housing. Further, the storage device or devices of the microarray may also be arbitrarily located within any of the drive bays of the rack mountable housing. In other words, the storage devices mapped to any one or more storage devices in any drive bay of the rack mountable housing, without any requirement of proximity or locality. For example, microarray (402) includes microarray controller (414), microarray (404) includes microarray controller (416) and microarray controller (418), and microarray (406) includes microarray controller (420); and microarray (308) includes microarray controller (422), microarray controller (424), microarray controller (426), and microarray controller (428).

In some embodiments, any microarray controller within the rack mountable housing may be located in any drive bay where a storage device may be located. For example, a microarray controller may have physical dimensions that are similar to physical dimensions of a storage device in the drive bay of the rack mountable housing, and the microarray controller may have similar communication ports, for example, an Ethernet port, a USB port, or some other communication protocol port.

Figure 5:
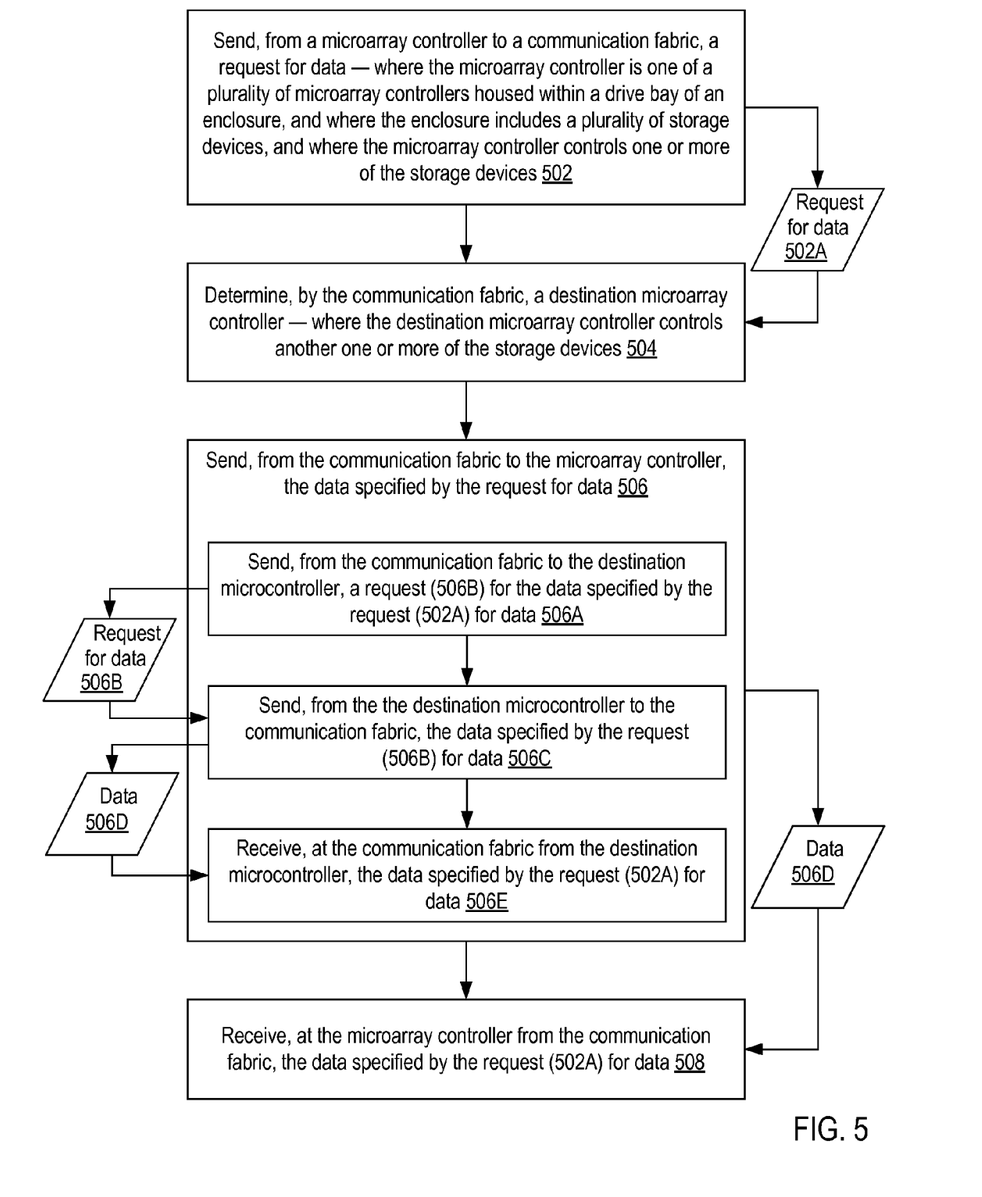
FIG. 5 illustrates a flow chart illustrating an exemplary method for a microarray system within a rack mountable housing according to embodiments of the present invention.

For further explanation, FIG. 5 sets forth a flow chart illustrating an exemplary method for a microarray system (104) within a rack mountable housing according to embodiments of the present invention that includes sending (502), from a microarray controller (320) to a communication fabric (106), a request (502A) for data, where the microarray controller is one of a plurality of microarray controllers (108) housed within a drive bay of an enclosure, and where the enclosure includes a plurality of storage devices (110), and where the microarray controller (320) controls one or more storage devices, for examples, the one or more storage devices within the virtual LAN (316) and the microarray (308).

This exemplary method of the microarray system (104) also includes determining (504), by the communication fabric (106), a destination microarray controller (322), where the destination microarray controller (322) controls another one or more of the storage devices (110), for example, the one or more storage devices within the virtual LAN (314) and the microarray (306).

This exemplary method of the microarray system (104) also includes sending (506), from the communication fabric (106) to the microarray controller (320), the data specified by the request (506A) for data received from the microarray controller (320).

Further in this example, sending (506) the data to the microarray controller (320) includes first receiving the data from the destination microarray controller (322), which includes sending (506A), from the communication fabric (106) to the destination microarray controller (322), a request (506B) for the data specified by the request (502A) for data. Further in this example, sending (506) the data to the microarray controller (320) includes sending (506C), from the destination microarray controller (322) to the communication fabric (106), the data specified by the request (506B) for data. Further in this example, sending (506) the data to the microarray controller (320) includes receiving (506E), at the communication fabric (106) from the destination microarray controller (322), the data specified by the request (502A) for data.

Finally in this example, the exemplary method of the microarray system (104) also includes receiving (508), at the microarray controller (320) from the communication fabric (106), the data specified by the request (502A) for data. In this way, microarray controller (320) may communicate with another microarray controller (322) in order to transfer data.

Similarly, in some embodiments, if any given microarray controller from any given microarray receives a request for data, where the data is not stored in a storage device controlled by the given microarray controller, then the given microarray controller may communicate with other microarray controllers from other microarrays to obtain and provide the data to satisfy the request for data. In other words, the plurality of microarray controllers (108) of microarray system (104) may collectively receive and respond to requests for data, where the data may reside within different microarrays controlled by different microarray controllers. In this way, data stored within the collective microarrays may appear to an application requesting data storage services as a single namespace. In some examples, such data storage services may appear a requesting application as a scaled down file system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computing devices (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing computing devices to produce a machine, such that the instructions, which execute via the processor of the computer or other programmable data processing computing devices, create means for implementing the functions/acts specified in the flowchart and/or block diagram block or blocks. These computer readable program instructions may also be stored in a computer readable storage medium that can direct a computer, a programmable data processing computing devices, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing computing devices, or other device to cause a series of operational steps to be performed on the computer, other programmable computing devices or other device to produce a computer implemented process, such that the instructions which execute on the computer, other programmable computing devices, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer system comprising:
a plurality of storage devices housed within a drive bay of an enclosure;
a plurality of microarrays, wherein one of the microarrays comprises a microarray controller mapped to one or more of the storage devices, wherein another one of the microarrays comprises another microarray controller mapped to another one or more of the storage devices, wherein the mapping of the one or more of the storage devices to the microarray controller is different than the mapping of the other one or more storage devices to the other microarray controller such that each one of the plurality of storage devices is controlled by one microarray controller, and wherein each microarray controller is the only assignor of its own storage devices; and
a communication fabric coupled to the plurality of microarray controllers, wherein the communication fabric is configured to route message traffic between the plurality of microarray controllers.

2. The computer system of claim 1, wherein the plurality of storage devices, the plurality of microarray controllers, and the communication fabric are implemented within a single rack mountable housing.

3. The system of claim 1, wherein each microarray controller of the plurality of microarray controllers is configured to implement a storage management system and the communication fabric is an Ethernet communication fabric.

4. The system of claim 3, wherein the plurality of microarray controllers includes microarray controllers configured to implement different storage management systems, wherein the different storage management systems include at least two of a block-based storage management system, a file-based storage management system, or an object-based storage management system.

5. The system of claim 3, wherein at least one storage management system is a redundant array of independent disks.

6. The system of claim 1, wherein the plurality of microarray controllers includes microarray controllers configured to implement a plurality of virtual local area networks.

7. A method comprising:
by first program instructions executing on a computing device:
sending, from a microarray controller to a communication fabric, a request for data, wherein the microarray controller is one of a plurality of microarray controllers housed within a drive bay of an enclosure, wherein the enclosure comprises a plurality of storage devices, and wherein the microarray controller controls one or more of the storage devices;
determining, by the communication fabric, a destination microarray controller from among the plurality of microarray controllers, wherein the destination microarray controller controls another one or more of the storage devices, wherein the mapping of the one or more of the storage devices to the microarray controller is different than the mapping of the other one or more storage devices to the destination microarray controller such that each one of the plurality of storage devices is controlled by one microarray controller, and wherein each microarray controller is the only assignor of its own storage devices;
sending, from the communication fabric to the microarray controller, the data specified by the request for data; and
receiving, at the microarray controller from the communication fabric, the data specified by the request for data.

8. The method of claim 7, further comprising:
sending, from the communication fabric to the destination controller, a request for the data specified in the request from the microarray controller to the communication fabric;
sending, from the destination microarray controller to the communication fabric, the data specified by the request for data; and receiving, at the communication fabric from the destination microarray controller, the data specified by the request for data.

9. The method of claim 7, wherein the plurality of microarray controllers includes microarray controllers configured to implement different storage management systems, wherein the different storage management systems include at least two of a block-based storage management system, a file-based storage management system, or an object-based storage management system.

10. The method of claim 7, wherein at least one storage management system is a redundant array of independent disks.

11. The method of claim 7, wherein the microarray controller implements a storage management system that is different from a storage management system implemented by the destination microarray controller.

12. The method of claim 7, wherein the plurality of microarray controllers includes microarray controllers configured to implement a plurality of virtual local area networks.

13. A computer program product disposed upon a computer readable medium, wherein the computer readable medium is not a signal, the computer program product comprising computer program instructions that, when executed, cause a computer to carry out the steps of:
sending, from a microarray controller to a communication fabric, a request for data, wherein the microarray controller is one of a plurality of microarray controllers housed within a drive bay of an enclosure, wherein the enclosure comprises a plurality of storage devices, and wherein the microarray controller controls one or more of the storage devices;
determining, by the communication fabric, a destination microarray controller from among the plurality of microarray controllers, wherein the destination microarray controller controls another one or more of the storage devices, wherein the mapping of the one or more of the storage devices to the microarray controller is different than the mapping of the other one or more storage devices to the destination microarray controller such that each one of the plurality of storage devices is controlled by one microarray controller, and wherein each microarray controller is the only assignor of its own storage devices;
sending, from the communication fabric to the microarray controller, the data specified by the request for data; and
receiving, at the microarray controller from the communication fabric, the data specified by the request for data.

14. The computer program product of claim 13, wherein the computer readable medium comprises a storage medium.

15. The computer program product of claim 13, wherein each microarray controller of the plurality of microarray controllers is configured to implement a storage management system.

16. The computer program product of claim 15, wherein the plurality of microarray controllers includes microarray controllers configured to implement different storage management systems, wherein the different storage management systems include at least two of a block-based storage management system, a file-based storage management system, or an object-based storage management system.

17. The computer program product of claim 15, wherein at least one storage management system is a redundant array of independent disks.

18. The computer program product of claim 15, wherein the microarray controller implements a storage management system that is different from a storage management system implemented by the destination microarray controller.

* * * * *